June 4, 1940.   R. C. ZASTROW   2,203,559
AUTOMATIC ACCELERATOR
Filed Feb. 18, 1938

INVENTOR
ROBERT C. ZASTROW
BY A. S. Knot
ATTORNEY

Patented June 4, 1940

2,203,559

UNITED STATES PATENT OFFICE 2,203,559

AUTOMATIC ACCELERATOR

Robert C. Zastrow, Racine, Wis.

Application February 18, 1938, Serial No. 191,143

5 Claims. (Cl. 192—.01)

The present invention comprises means for automatically accelerating the engine of an automobile and the like, by means of devices which are actuated by certain cooperating positions of the brake and clutch pedals whereby the engine is accelerated independent of the accelerator pedal and when the clutch and brake pedals are simultaneously at certain predetermined positions.

The object of the present invention is, generally stated, to make driving an automobile and the like, safer, more convenient and more enjoyable.

The present invention is particularly useful when it is necessary to shift gears on a hill side or to start a car after being brought to rest on a hill, wherein the device automatically accelerates the engine if the brake is not fully released before the clutch is engaged, thus a slight error in judgment on the part of the driver in manipulating the clutch and brake will not accidentally kill the engine.

When the driver wishes to start a car on a hill it must be held from moving by engaging the brakes. If the brakes are disengaged even for a moment before the clutch is engaged, the car will begin to move backward, and then when the clutch is engaged, the engine must first stop the car movement and then start it in the opposite direction. Under these circumstances, it is difficult to prevent killing the engine, because one must engage the clutch at the very moment or before the brakes are fully released, and unless the operator is skilled, the usual result is to kill the engine, or loose control of the car. These operations are difficult because the right foot must be shifted very quickly from the brake pedal to the accelerator pedal and the clutch must be engaged on the moment or the hand operated accelerator used at the right moment.

The present invention provides means whereby the engine is automatically accelerated as the clutch is engaged and before the brakes have been released.

My device also has means whereby when the clutch is disengaged, the accelerating device is automatically released; and when the brakes are released, the accelerator device is automatically made inoperative. Thus, the operation of applicant's device is two-fold and entirely automatic and releases the driver from the responsibility of an operation which is difficult at a time when a slight error might cause a serious accident; and, while I call my device an automatic accelerator, it is also an automatic deaccelerator. That is, acceleration takes place only when needed and when not needed the device will be inoperative.

I accomplish the foregoing objects by the use of preferably a brake pedal controlled electric device, cooperating preferably with a clutch pedal vacuum operated power valve moving device.

The arrangement of applicant's device is such as will make the device inoperative when not needed. For example, if the brake is not engaged when the clutch is engaged, there will be no acceleration except that caused by the foot pressure on the accelerator pedal. On the other hand, if the accelerator device is in a position to engage the power valve and the clutch is not engaged, the accelerator will be inoperative. Clearly there is no need for acceleration when the clutch is disengaged.

In the present device, I preferably make use of the action of the brake pedal to close an electric switch which will cause the accelerator device to be moved into an operating position, and the accelerating device is preferably operated by the clutch pedal controlled valve through a vacuum secured from the manifold. I may, however, elect to operate either device hydraulically or mechanically. For example, the accelerating device may be drawn into operating position in some other manner than electrically, or for example, as in the device illustrated in Figure 5.

To these and other useful ends my invention consists of parts, combinations of parts or their equivalents, and mode of operation, as hereinafter described and claimed and shown in the accompanying drawing in which:

Figure 1:
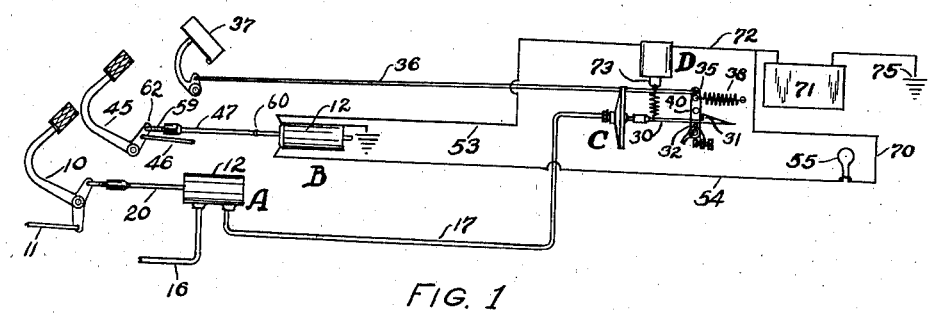
Fig. 1 is a diagrammatic drawing illustrating a complete assembly of the working parts of the preferred form of my invention.

In the figures, the vacuum valve is designated in its entirety by reference character A and the electric switch is designated in its entirety by reference character B. The mechanism for moving the power valve in its entirety is designated by reference character C, and the mechanism for moving C into its operating position with the power valve is designated in its entirety by reference character D.

In the preferred form of my invention as illustrated in Figures 1 to 4 inclusive, numeral 10 designates the clutch pedal, 11 designates the connection leading to the clutch mechanism. The vacuum valve A comprises a cylindrical chamber 12, having therein a piston type valve 13 and ports 14 and 15. Port 15 has a pipe connection 16 which leads to the inlet manifold of the engine.

Port 14 has a pipe connection 17 which leads to the vacuum operated device C. Valve 13 is chambered out as at 19 and having a rod connection 20 which leads to the clutch pedal as at 21 and having a screw threaded length adjusting connection as at 22.

Figure 2:
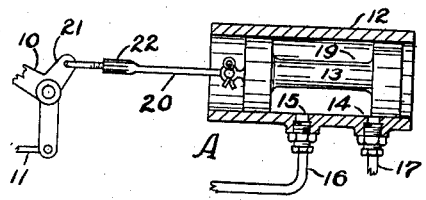
Fig. 2 is a longitudinally sectioned view of the vacuum valve.

In Figures 1 and 2 I illustrate the clutch pedal as being in a position to slightly engage the clutch, the connection 20 being adjusted so valve 13 has already slightly uncovered port 14.

It will be seen that as the clutch is engaged, the vacuum in the manifold will be conveyed to member C through pipe 17. Member C comprises a diaphragm 25 and a retrieving spring 26. The diaphragm 25 is provided with a centrally positioned lug 27 having a pivotally mounted rod 28 which is screwed into the enlarged end 29 of link 30. This link has a hook shaped device as at 31 and is provided with a stop 32 upon which the link rests.

I provide a conventional power valve lever 35 having a link connection 36 which leads to a conventional accelerator pedal 37. Member 35 is preferably provided with a retrieving spring 38 and a conventional adjusting screw 39 by means of which the desired idling speed of the engine may be secured.

Figure 3:
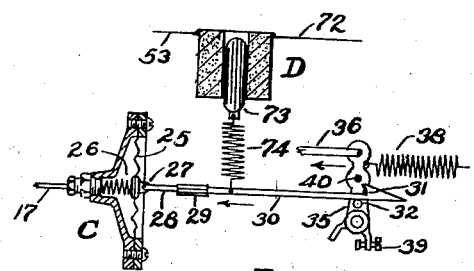
Fig. 3 is a partially sectioned view of the means used for operating the power valve.
Figure 4:
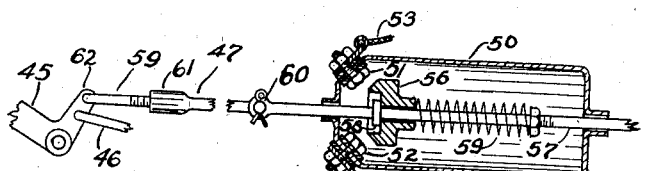
Fig. 4 is a longitudinally sectioned view of the electrical switch.

I provide a pin 40 on member 35 which is, as indicated in Figure 3, normally positioned slightly forward and above the top point of member 31 so that when the clutch pedal begins to engage the clutch, diaphragm 25 will move rod 30 forward in the direction indicated by arrow and member 31 will pass under pin 40.

I provide a brake pedal 45 having a conventional rod 46 which is adapted to operate the brakes in any suitable manner. I also provide a rod 47 which is adapted to operate the stop light switch B and the solenoid D as follows:

Switch housing 50 is provided at its forward end with insulated contact members 51 and 52. Member 51 has a wire connection 53 which is operatively connected to solenoid D. Contact member 52 is provided with a wire 54 which leads to a conventional stop light bulb 55.

I provide an annular contact member 56 which is slidably mounted on rod 57 and yieldingly held forward against collar 58 by means of spring 59 as illustrated. Rod 57 at its forward end is pivotally secured to a rod 47 as at 60, the front end being enlarged as at 61 and having a short link 59 which is screw threaded therein, the front end being pivotally secured to the brake pedal arm 62.

It will be seen that when the brake pedal is moved forward and is about to engage the brakes, block 56 will yieldingly contact members 51 and 52.

It will be understood that switch B is grounded as indicated in Figure 1. A wire 70 makes a connection from stop light bulb 55 to the storage battery 71 as indicated and the connection 72 is made between the battery and solenoid D. The other side of the battery is grounded as at 75.

Thus, when the contacts in switch B are engaged as already described, solenoid D will be energized. I provide a solenoid core 73, having a spring 74 for operatively engaging member 30 as illustrated in Figure 3. Spring 74 is of a push and pull type, thus the weight of core 73 will be supported by member 30 and definitely hold member 30 in the position shown, but when the solenoid is energized, core 73 will be lifted and the hook 31 on member 30 will be moved to a position where it will engage pin 40.

Thus it will be seen that if the brake pedal is not operated and the clutch is made to operate, hook 31 will be moved forward but will not engage pin 40. However, if the brake is operated before the clutch is caused to be engaged, solenoid core 73 will be lifted and member 31 will be moved in the path of pin 40. Then when the clutch pedal approaches a point where the clutch will be engaged, valve 13 will uncover port 14 and cause the diaphragm 25 to move forward by reason of the vacuum in its chamber, thus to accelerate the engine by moving pin 40 in the direction indicated by arrow.

Clearly, when it is necessary to use the brakes on a hill and simultaneously start the car, member 31 will be in position to engage pin 40; and then, when the clutch is engaged, the engine will be automatically accelerated. If, however, the clutch is disengaged, the acceleration will be discontinued because diaphragm 25 will be returned to its normal position by spring 26.

It will be seen that the only time the clutch control will act to accelerate the engine will be when the brakes are engaged. Thus the device will act automatically to accelerate the engine when the brakes are used for preventing the backward movement of the car on a hill. Or, for example, in heavy traffic if the operator should accidentally engage the clutch before the brakes are disengaged, my device will automatically act to prevent accidentally killing the engine.

Valve A and switch B may be made to operate at any predetermined point by the adjusting means provided on rods 20 and 47. These adjustments are easily made to suit the requirements of the driver. Generally stated, rod 20 will be adjusted to operate member C at about the time the clutch is engaged, and the rod 47 of switch B will be adjusted so member D will operate at the point where the brakes are slightly engaged; and when these members are so adjusted, the operator need give no attention to the device because it will automatically take care of the power requirements and also automatically disengage itself when acceleration is not needed.

It will be noted that the power valve is always under the control of the operator except when acceleration is needed at a time when the brakes are engaged; and when the brake is released, acceleration will continue until the operator places his foot on the accelerator pedal and increases the acceleration in the normal way, then hook 31 will drop to its inoperative position.

The front edge of hook 31, it will be noted (see Figure 3), may be tapered rearwardly toward the bottom; thus it will not disengage itself until after the driver places his foot on accelerator pedal 37; thus acceleration will continue during the time the driver moves his foot from the brake pedal to the accelerator pedal.

Figure 5:
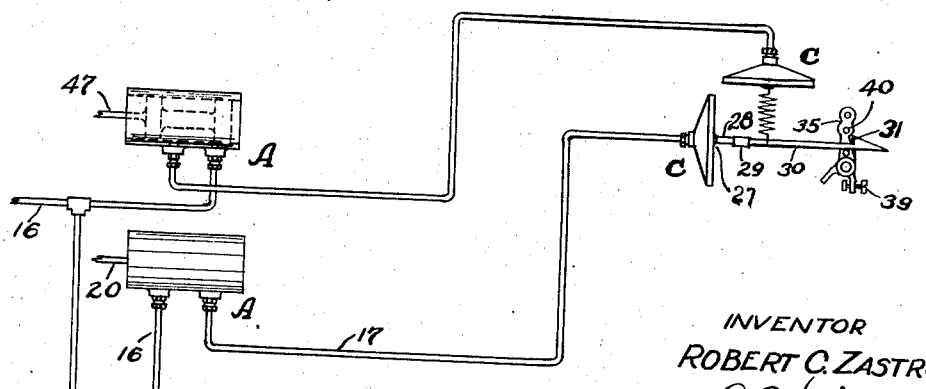
Fig. 5 is a diagrammatic drawing illustrating a modification.

In Figure 5 I have illustrated practically the same device as shown in Figure 1 except that a vacuum is used for engaging hook 31 instead of a solenoid. Two valves A and two diaphragm units C are used with which to operate the power valve lever 35. The operation of this device is, therefore, wholly by vacuum and will be understood without further explanation.

Clearly, other means may be used for lifting link 30 or for pulling this link forward so as to accelerate the engine. However, I have shown the preferred form for accomplishing the results desired. Obviously, many minor changes may be made in the details without departing from the spirit and scope of the present invention as recited in the appended claims.

Having thus shown and described my invention, I claim:

1. A motor vehicle having brake and clutch pedals and a power valve in combination with an automatic accelerator, said accelerator comprising cooperating means between said pedals and said power valve whereby when said brakes are engaged, said accelerator will be made operative and then when said clutch pedal is moved to engage the clutch, said power valve will be moved to thereby accelerate the engine.

2. A motor vehicle having normally separate clutch and brake pedals and a power valve having a normal accelerator means, in combination with automatic supplemental means for operating said power valve, characterized by the fact that, said supplemental means comprising a clutch pedal controlled valve having an operating connection to the inlet manifold of the engine and to a normally inoperative means for operating said power valve, an electric switch having operating connections to said brake pedal and to said normally inoperative means whereby when said brake pedal is operated to engage the brakes, said normally inoperative means will be made operative whereby when said clutch pedal is moved to engage the clutch said power valve will be moved to accelerate the engine until normal acceleration is effective.

3. A motor vehicle having brake and clutch pedals and a power valve in combination with an automatic accelerator, said accelerator comprising an electric switch operatively connected to said brake pedal, a source of electrical supply and a coil, a valve having an operating connection to said clutch pedal and the inlet manifold and to a normally inoperative power valve operating means having an operating connection to said coil whereby when said brake pedal is moved to engage the brakes before said clutch pedal causes the clutch to be engaged, said normally inoperative device will be made operative, and caused to operate said power valve when said clutch pedal is moved to engage the clutch.

4. A motor vehicle having a brake, a clutch and a normally inoperative means connected thereto adapted to accelerate the engine when made operative, means having an operative connection to the brake and a connection to said normally inoperative means whereby when the brakes are engaged before said clutch is engaged, said normally inoperative means is made operative whereby said valve will be moved to thereby accelerate the engine when said clutch is engaged.

5. A device as recited in claim 1 including; adjusting means on said brake and clutch operating means whereby they may be caused to operate said accelerator means at different positions of said clutch relative to said brake means.

ROBERT C. ZASTROW.